United States Patent [19]

Hartsell

[11] 4,311,121
[45] Jan. 19, 1982

[54] ROTARY DEVICE

[76] Inventor: Larry L. Hartsell, 3100 Alco, Pontiac, Mich. 48055

[21] Appl. No.: 78,148

[22] Filed: Sep. 24, 1979

[51] Int. Cl.$^3$ ............................................. F02B 53/00
[52] U.S. Cl. .................................... 123/228; 418/245
[58] Field of Search ............... 123/228, 229, 231, 244; 418/245

[56] References Cited

U.S. PATENT DOCUMENTS

| | | | |
|---|---|---|---|
| 859,474 | 7/1907 | Williams | 123/228 |
| 2,175,265 | 10/1939 | Johnson | 123/228 |
| 2,346,646 | 4/1944 | Beech | 123/228 |
| 2,353,446 | 7/1944 | Davidson | 123/228 |
| 2,366,213 | 1/1945 | Pover | 123/244 X |
| 3,921,597 | 11/1975 | Franco | 123/228 |

FOREIGN PATENT DOCUMENTS 2725036 12/1978 Fed. Rep. of Germany ...... 123/228

*Primary Examiner*—Michael Koczo, Jr.
*Attorney, Agent, or Firm*—Gifford, VanOphem, Sheridan & Sprinkle

[57] ABSTRACT

An improved rotary device is provided which can be used either as an internal combustion engine or a compressor. The device includes a housing having an interior cylindrical chamber; a rotary piston with at least one, but preferably three protruding lobes, positioned within the chamber; and a shaft for rotatably mounting the rotary piston coaxially within the chamber. At least one and preferably two diametrically opposed planar seal members are slidably disposed within slots formed in the housing and open to the housing chamber. An elongated guide member is secured at one end to each seal member and, at its other end, is positioned within a guide slot formed in at least one and preferably both axial ends of the rotary piston. The guide slots are formed so as to maintain one end of each seal member in sealing contact with the rotary piston regardless of its rotational position. A first fluid port is adjacent and immediately upstream from each seal member and a second port is adjacent and immediately downstream from each seal member.

When used as an internal combustion engine, the rotary device further includes a pair of diametrically opposed igniters, such as spark plugs, in between the seal members. In addition, a first planar valve member is slidably disposed in a slot in the housing upstream from each igniter while, similarly, a second valve member is slidably disposed in a slot formed in the housing downstream from each igniter. An elongated cam follower secured at one end to the first valve member engages and follows a first cam slot formed along at least one and preferably both axial ends of the rotary piston. Similarly, an elongated cam follower is secured at one end to the second valve member and at its other end engages a second cam slot formed in at least one and preferably both axial ends of the rotary piston to control the longitudinal displacement of the second valve member. The first cam slot is formed to sealingly engage the first valve member against the piston when a piston lobe passes under it. The second cam slot is formed to sealingly disengage said second valve member from said piston when the lobe passes under it.

5 Claims, 7 Drawing Figures

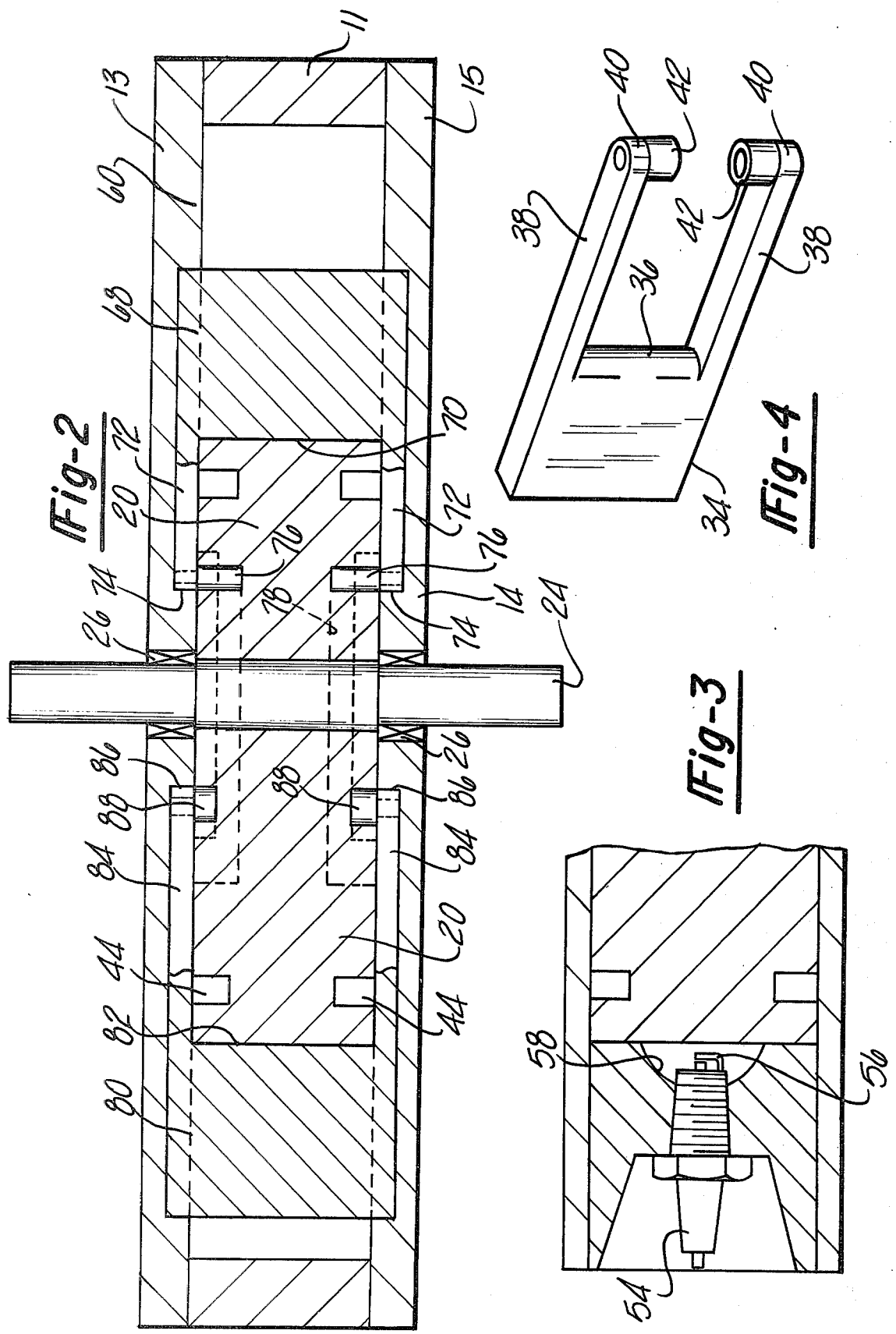

ROTARY DEVICE

BACKGROUND OF THE INVENTION

I. Field of the Invention

The present invention relates generally to engines and compressors and, more particularly, to such an engine or compressor which utilizes a rotary piston member.

II. Description of the Prior Art

As used herein, the term "rotary device" shall collectively refer to engines and compressors. It will be understood by all skilled in the art that engines and compressors are analogous to each other and, oftentimes, a single device can be alternatively used as either an engine or a compressor.

There have been a number of previously known compressors and engines which employ a rotary piston in contrast to a reciprocal piston. A Wankel engine, for example, forms one type of previously known rotary piston engine.

These previously known rotary devices typically comprise a housing having a single internal chamber in which the rotary piston is positioned and rotatably mounted by a drive shaft to the housing. The rotary piston itself is triangular in shape thus having three outwardly protruding lobes. A seal member is then secured to the apex of each lobe and sealingly engages the walls of the chamber. Thus, upon rotation of the rotary piston, the rotary piston, sequentially inducts a fuel/air mixture into the chamber and compresses this fuel/air mixture in a reduced volume compression chamber formed between two lobes of the triangular piston and the walls of the chamber. This compressed fuel/air misture is then ignited and the resulting combustion rotatably drives the piston in the well known fashion.

One disadvantage of these previously known rotary piston engines, however, is that the piston apex seals are subject to rapid wear and tear due to their constant sliding engagement with the interior walls of the housing chamber. Replacement of the apex seals, when worn, requires almost complete disassembly of the engine and, therefore, is costly and time consuming to accomplish. At least partly for this reason, rotary piston engines have not enjoyed widespread acceptance or use.

SUMMARY OF THE PRESENT INVENTION

The present invention overcomes the above mentioned disadvantages of the previously known rotary devices by providing a rotary device with improved means for sealing the rotary piston to the walls of the housing chamber.

In brief, the rotary device according to the present invention comprises a housing having a cylindrical chamber formed therein. A rotary piston is positioned within the housing chamber and rotatably mounted coaxially to the chamber by means of a drive shaft. The rotary piston itself is generally triangular in shape thus having three outwardly protruding lobes with a radial length substantially the same as the radius of the housing chamber.

A pair of planar seal members are longitudinally slidably positioned within diametrically opposed slots formed in the housing and open to the housing chamber. An elongated guide means is secured at one end to each seal member and, at its other end, includes a guide pin which is positioned within a guide slot formed on at least one and preferably both axial ends of the rotary piston. The guide slot itself is formed so that upon rotation of the piston, one edge of each seal member remains in sealing contact with the rotary piston.

A fluid outlet port open to the chamber is formed immediately upstream from and adjacent to each seal member with respect to the direction of rotation of the rotary piston. A fluid inlet port open to the housing chamber is similarly formed adjacent to but downstream from each seal member. Consequently, when the rotary device of the present invention is employed as a compressor, upon rotation of the piston, the rotary piston inducts fluid from the inlet port into the housing chamber and then compresses this inducted fluid in between one seal member, one lobe of the rotary piston and the walls of the housing chamber. The compressed fluid itself is exhausted out through the fluid outlet port.

When the rotary device of the present invention is to be used as an internal combustion engine, a pair of diametrically opposed spark plugs, or similar igniters, are connected to the engine housing so that one spark plug is positioned in between and on both sides of the seal members. In this event, each fluid inlet port is connected to a source of an fuel/air mixture while each fluid outlet port forms an exhaust passageway from the engine.

A first planar valve member is slidably positioned within a slot housing open to the chamber immediately upstream from each spark plug while, similarly, a second planar valve member is slidably disposed in a slot open to the chamber immediately downstream from each spark plug. In addition, an elongated cam follower means is connected at one end to the first valve member and, at its other end, includes a cam pin which is received within and follows a first cam slot formed in at least one and preferably both axial ends of the rotary piston. Likewise, an elongated cam follower means is connected at one end to each second valve member and, at it other end, includes a cam pin which is received within a second can slot formed in at least one and preferably both axial ends of the rotary piston. Consequently, the first cam slot controls the longitudinal displacement of the first valve member whicle the second can slot controls the longitudinal displacement of the second valve member.

Unlike the seal members, however, the valve members do not remain in constant sealing contact with the rotary piston. Instead, the first cam slot is formed so as to maintain the first valve member in a spaced apart relation with respect to the rotary piston until a lobe of the piston is substantially aligned with it. At that time, the first valve cam slot longitudinally shifts the first valve member radial inwardly and into sealing contact with the rotary piston. Conversely, the second cam slot is formed so as to maintain the second valve member in sealing contact with the rotary piston member until one lobe of the piston member is substantially aligned with it. At that time, the second valve member is displaced radially outwardly away from the rotary piston. It will be understood, of course, that this sequence is repeated three times for each revolution of the rotary piston.

In the operation of the engine, rotation of the rotary piston inducts a fuel/air mixture into the chamber so that this fuel/air mixture is entrapped between the piston and the walls of the chamber. Continued rotation of the rotary piston compresses this fuel/air mixture between the lobe of the piston and the second valve member until the lobe of the piston is aligned with the first valve member at which time the first valve member sealingly contacts the rotary piston and forms a combustion chamber between the valve members, the piston and the walls of the housing chamber.

Ignition of the compressed air/fuel mixture within the combustion chamber is effected by the spark plug when the lobe of the piston is substantially aligned with the second valve member. Simultaneously, the second valve member is shifted radially outwardly from the rotary piston thus enabling the expanding combustion products to rotatably drive the rotary piston in the desired fashion. The combustion products are then exhausted out through the first fluid passageway and the cycle is repeated.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 2 is a sectional view taken substantially along line 2—2 in FIG. 1;

FIG. 3 is a fragmentary sectional view taken substantially along line 3—3 in FIG. 1;

FIG. 4 is a perspective view illustrating an element of the rotary device according to the present invention;

DETAILED DESCRIPTION OF THE PRESENT INVENTION

Figure 1:
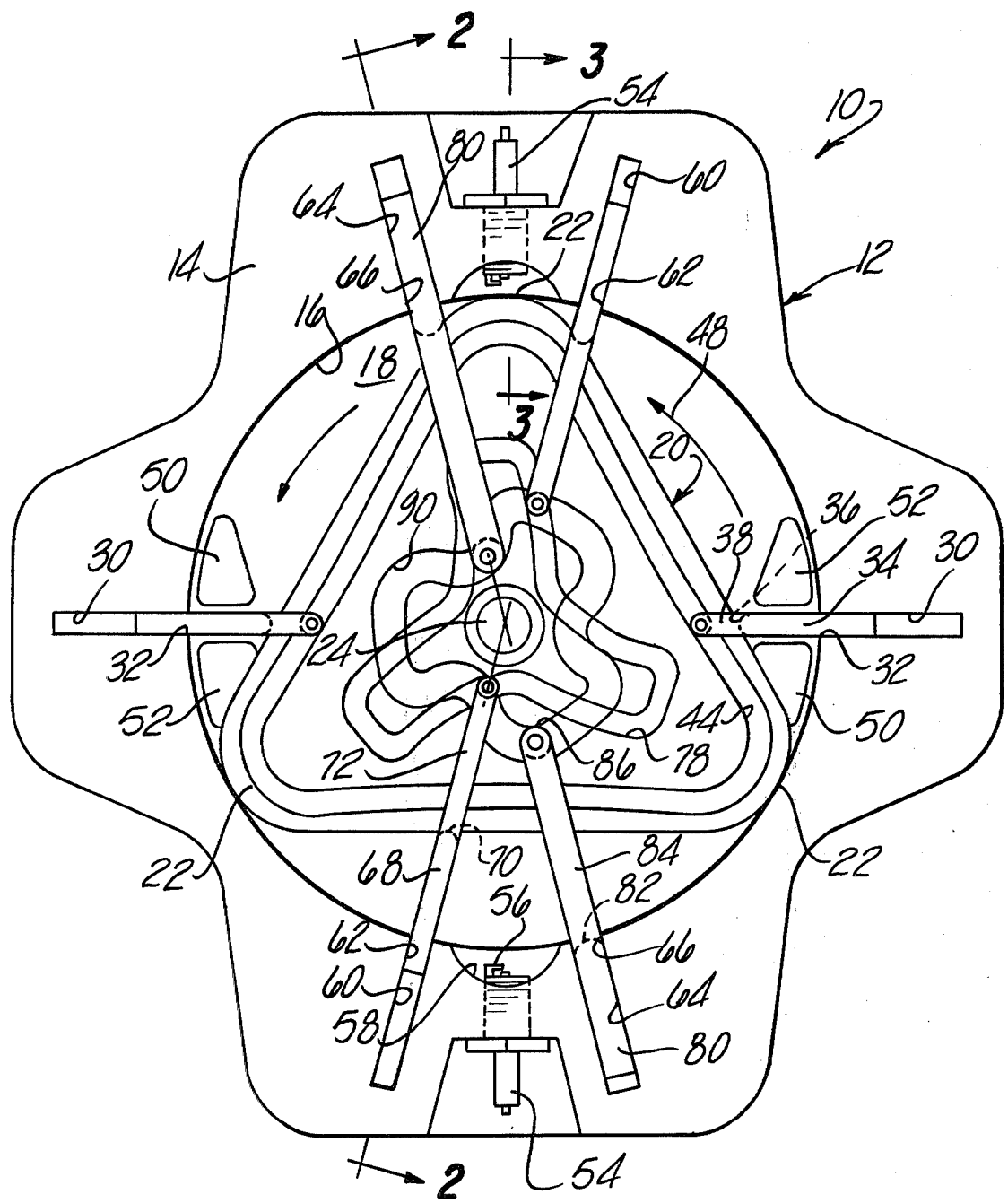
FIG. 1 is a sectional view illustrating the rotary device according to the present invention as an internal combustion engine.

With reference first to FIGS. 1–4, the rotary device 10 according to the present invention is thereshown and illustrated as an internal combustion engine 12. The engine 12 further comprises a housing 14 having an interior cylindrical wall 16 which defines an interior cylindrical chamber 18 within the housing 14. In the preferred form of the invention, the housing 12 further comprises an annular housing member 11 having its axial ends closed by front and back plates 13 and 15, respectively.

The engine 12 further includes a rotary piston 20. The piston 20 is generally triangular in shape thus having three outwardly protruding lobes 22. Moreover, the length of each lobe 22 from the center of the rotor 20 is substantially the same as the radius of the cylindrical housing chamber 18.

With reference now particularly to FIGS. 1 and 2, the rotor 20 is secured at its center to a main shaft 24 by any conventional means, such as a key (not shown). The shaft 24 itself is rotatably mounted to the engine housing 14 by bearings 26 so that the shaft 24 with its attached rotary piston 20 is coaxial with the housing chamber 18. Thus, upon rotation of the shaft 24, the apex of each rotor lobe 22 remains closely adjacent the chamber wall 16. A slight clearance space between the apex of each lobe 22 and the wall 16 of the housing chamber is, of course, required in order to permit rotation of the rotary piston 20.

With reference now to FIGS. 1, 2, and 4, a pair of diametrically opposed slots 30 are formed in the housing 14 so that one end 32 of each slot is open to the housing chamber 18. A planar seal member 34 having a sealing edge 36 is slidably disposed in each slot 30 so that the sealing edge 36 extends towards the housing chamber 18. The length of the sealing edge 36, moreover, is substantially the same as the width of the rotary piston 20.

The seal member 34 further includes a pair of parallel cam follower arms 38 which extend outwardly from the sealing edge 36 and terminate at a free end 40. A cam pin 42 is preferably rotatably connected to the free end 40 of each arm 38 so that the pins 42 are coaxial with and face each other.

As is best shown in FIG. 1, each seal member 34 is slidably disposed within one of the slots 30 so that the arms 38 extend around the axial ends of the piston 20 and so that the cam pins 42 are positioned within a guide slot 44 formed in each axial end of the rotary piston 20. The guide slots 44 are dimensioned to maintain the seal members 34 in sealing engagement with the outer periphery of the rotary piston 20 during the rotation of the piston 20.

With reference now to FIG. 1, in a manner which will be hereinafter described in greater detail, the piston 20 is designed to rotate in a counterclockwise direction as indicated by arrows 48. Thus, for ease of description, the term "downstream" shall mean the direction counterclockwise, i.e. the direction of rotation of the piston 20, from a specified point along the engine chamber 18 and the term "upstream" shall mean the opposite.

An exhaust port 50 is formed through the engine housing 14 and open to the chamber 18 immediately upstream from each seal member 34. Similarly, an intake port 52 is open to the chamber 18 immediately downstream from the seal member 34. The exhaust port 50 is connected to an exhaust manifold (not shown) while, conversely, the intake port 52 is connected to an intake manifold (not shown).

Referring now to FIGS. 1 and 3, a pair of spark plugs 54 are secured to the housing 14 so that the spark plugs 54 are diametrically opposed from each other and are positioned approximately 90° C. away from the seal members 34. Each spark plug 54 further includes a spark forming end 56 positioned within a recess 58 open to the engine chamber 18. Conventional timing means (not shown) are connected to the spark plugs 54 for activating the spark plugs 54 at selected rotational positions of the rotary piston 20 as will be subsequently described.

Referring now particularly to FIGS. 1 and 2, a slot 60 is formed in the engine housing 14 immediately upstream from each spark plug 54 so that one end 62 of the slots 60 is open to the engine chamber 18. Similarly, a further slot 64 is formed in the engine housing 14 immediately downstream from each spark plug 54 so that one end 66 of each slot 64 is open to the engine chamber 18.

A first planar valve member 68 is slidably disposed in each slot 60 and has an edge 70 which faces towards the engine chamber 18 and is of a length substantially the same as the width of the piston 20.

Like the seal members 34, a pair of elongated parallel arms 72 extend outwardly from the edge 70 of the valve member 68 and terminate at a free end 74. A pair of coaxial cam pins are secured to the free end 74 of each arm 72 so that the cam pins 76 are coaxial and face each other. The cam pins 76 moreover are preferably rotatably mounted to the arm 72 and each cam pin 76 is positioned within a cam slot 78 formed on each axial end of the rotary piston 20. The longitudinal displacement of the valve member 68 is dependent upon the path of the cam slot 78.

Still referring to FIGS. 1 and 2, a second planar valve member 80 is slidably disposed within each second slot 64 and has a free edge 82 of a length substantially the same as the width of the rotary piston 20. Like the first valve member 68, the second valve member 80 also includes a pair of parallel arms 84 which extend outwardly from the edge 82 of the second valve 80 and terminate at a free end 86. A cam pin 88 is preferably rotatably mounted to the free end 86 of the arms 84 so that the cam pins 88 are coaxial with and face each other. Each cam pin 88 in turn is received within a second cam slot 90 formed on the axial ends of the rotary piston 20 so that the longitudinal displacement of the second valve 80 is dependent upon the path of the second cam slot 90.

Unlike the seal members 34, the edges 70 and 82 of the first and second valve members 68 and 80, do not remain in constant sealing contact with the rotary piston 20. Instead, these valve members 68 and 80 are selectively moved into engagement with and spaced apart from the rotary piston 20 in accordance with the contour or path of their respective cam slots 78 and 90. Moreover, in order to retain the cam pins 76 and 88 in their proper cam slot 78 and 90, respectively, the first cam pin 76 is axially longer than the second cam pin 88 but has a cross-sectional shape which is smaller than the second cam pin 88. This construction insures that each cam pin remains within its proper cam slot.

Figure 5:
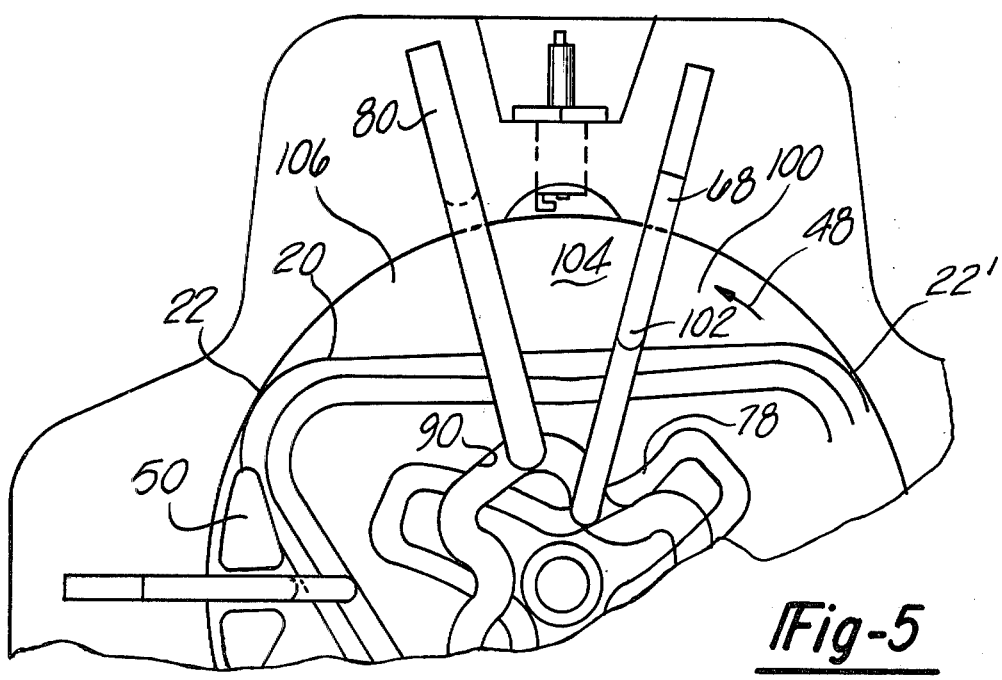
FIG. 5 is a fragmentary sectional view illustrating the rotary device of the present invention in one operative position.

The component parts of the rotary engine having been described, the operation of the engine 12 will be described particularly with reference to FIGS. 5 and 6. As is shown in FIG. 5, the rotation of the left lobe 22 past the right hand fuel/air intake port 52 inducts a fuel/air mixture into an induction chamber 100 which is formed between the right hand lobe 22' and the first valve member 68. Upon the continued rotation of the piston 20 from the position shown in FIG. 5, the second valve member 80 moves into sealing contact with the outer periphery of the piston 20 due to the contour of its cam slot 90. Conversely, due to the contour of the first cam slot 78, the first valve member 68 is radially displaced away from the piston 20 thus establishing fluid communication between the induction chamber 100 and a combustion chamber 104 between the valve members 68 and 80.

Upon continued rotation of the piston 20, the lobe 22' further compresses the inducted fuel/air mixture against the second valve member 80 and in the combustion chamber 104 when the rotor lobe 22' is substantially aligned with the first valve member 68, the first valve member 68 moves into sealing contact with the outer periphery of the rotary piston 20 and thus seals the combustion chamber 104 from the induction chamber 100. At this time, a compressed fuel/air mixture is contained within the combustion chamber 104.

Figure 6:
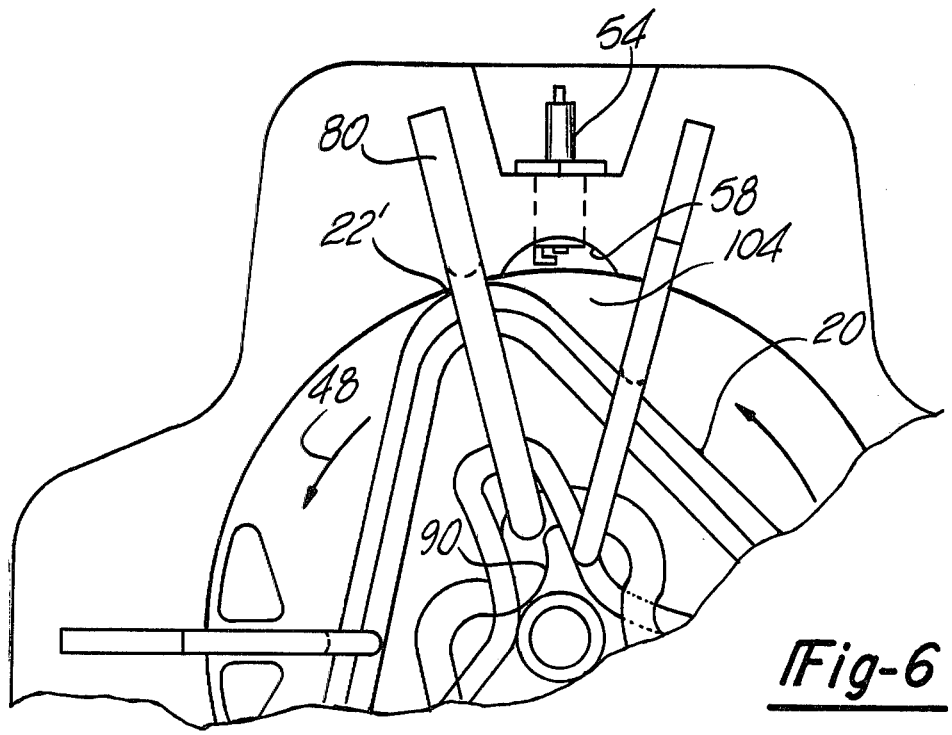
FIG. 6 is a fragmentary sectional view illustrating the rotary device of the present invention in a further operative position.

With reference now primarily to FIG. 6, the continued rotation of the rotary piston 20 brings the lobe 22' substantially into alignment with the second valve member 80 thus forming a somewhat triangularly shaped combustion chamber 104. In addition, the lobe 22 can freely pass through the combustion chamber 104 to the position shown in FIG. 6 due to the cavity 58 formed in the engine about the end of the spark plug 54. At this time, both valve members 68 and 80 are in sealing contact with the piston 20.

Still referring to FIG. 6, the spark plug 54 is energized when the lobe 22 substantially is aligned with the second valve member 80 and the resulting combustion rotatably drives the piston 20 in the counterclockwise direction as indicated by the arrows 48. Moreover, due to the contour of the second cam slot 90, substantially simultaneously with the combustion of the air/fuel mixture in the combustion chamber, the second valve member 80 is radially shifted away from the piston 20 thus enabling the combustion products to expand into an exhaust chamber 106 (FIG. 5) downstream from the combustion chamber 104. At this time, the first valve member 68 remains in sealing contact with the piston 20 to prevent engine blow back. Upon the continued rotation of the piston 20, the exhaust products from the exhaust chamber 106 are exhausted out through the engine exhaust port 50.

Following engine combustion, the second valve member 80 is again moved into sealing contact with the piston 20, the first valve member 68 is moved to a position spaced apart from the piston 20, and the above described process is repeated. It will also be understood that six combustion cycles occur for each revolution of the rotary piston 20.

Figure 7:
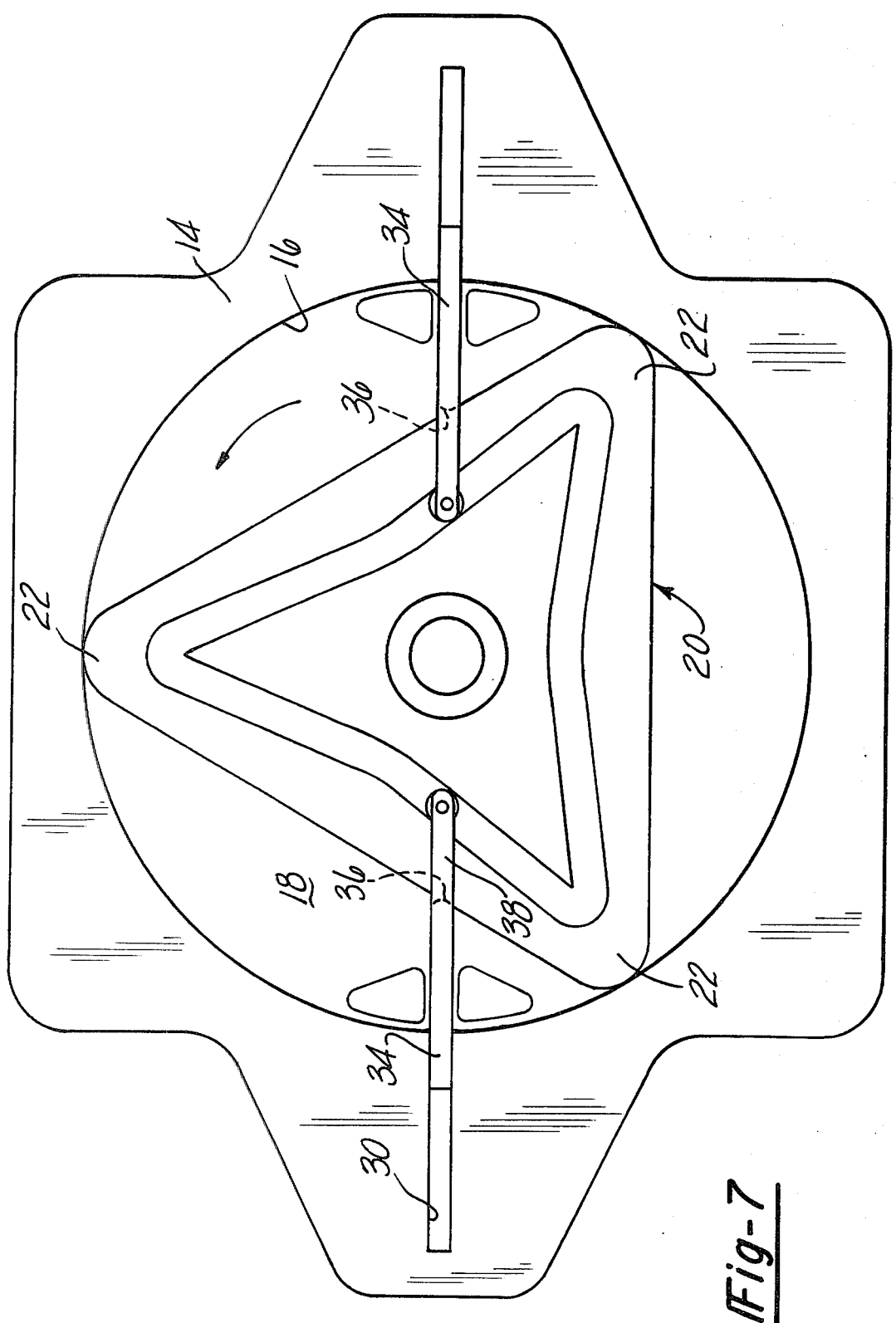
FIG. 7 is a sectional view illustrating the rotary device of the present invention as a compressor.

With reference to FIG. 7, in the event that the rotary device 10 according to the present invention is to be used as a compressor, rather than an engine, the spark plugs 54, first valve member 68, second valve members 80 and their associated components are simply removed from the engine. The ports 50 would form the compressor outlet while the ports 52 would form the compressor inlet port. Thus, upon rotation of the rotary piston 20, the gas is inducted from the inlet ports 52 and compressed in between the rotor lobes 22 and the seal members 34 and this compressed gas is forced out through the compressor outlet port 50.

From the foregoing, it can be seen that the rotary device 10 according to the present invention provides a novel engine and/or compressor which eliminates the apex seals of the previously known rotary engines and their associated problems. Moreover, since six combustion cycles occur during each revolution of the rotary piston, a very compact engine construction can be obtained without sacrifice of engine power.

Although my valves and seal members have been disclosed as actuated by their respective cam pins and cam slots, other means to actuate them are also possible. For example, a pair of cam members can be secured to the drive shaft and operate the valves and seal members via a push rod and rocker arm arrangement.

Having described my invention, however, many modifications thereto will become apparent to those skilled in the art to which it pertains without deviation from the spirit of the invention as defined by the scope of the appended claims.

I claim:
1. A rotary device comprising:
   a housing having a wall defining an interior cylindrical chamber;
   a rotary piston positioned within said chamber;
   means for rotatably mounting said piston member to said housing coaxially with said chamber;

said piston member having at least one radially outwardly protruding lobe having a length substantially the same as the radius of said chamber;

at least one planar seal member, said seal member being slidably mounted in a slot in said housing, said slot being open to said chamber so that one edge of the seal member extends into said chamber;

means for slidably displacing said seal member in said slot in synchronism with the rotation of said piston member so that said edge of said seal member sealingly engages the outer circumference of said piston;

fluid passage means formed through said housing and open to said housing chamber adjacent said seal member;

wherein said fluid passage means comprises a fuel/air intake open at one end to said chamber and at its other end to a fuel/air source whereby, upon rotation, said piston inducts a fuel/air mixture into said chamber, said device further comprising means for igniting said fuel/air mixture at a selected rotational position of the piston to thereby rotatably drive said piston;

wherein said igniting means comprises an igniter and wherein said device further comprises a first planar valve member slidably disposed in a slot in said housing adjacent to and upstream from said igniter with respect to the rotation of said piston, a second planar valve member slidably disposed in a slot in said housing downstream from said igniter, said valve members forming a combustion chamber therebetween, and means for radially displacing said valve members in said slots in synchronism with the rotation of said piston whereby said first valve member is spaced apart from piston until said lobe is substantially aligned with said first valve member and whereby said second valve member becomes spaced apart from said piston when said lobe is substantially aligned with said second valve member;

wherein said means for displacing said valve members comprises a pair of cam slots formed on at least one axial end of said piston, a first elongated cam follower having one end secured to the first valve member and its other end positioned within one of said cam slots and a second elongated cam follower having one end connected to said second valve member and its other end positioned within the other cam slot; and wherein a first cam follower pin is secured to said other end of said first cam follower means, a second cam follower pin is secured to said other end of said second cam follower means and wherein one of said pins is longer but has a cross-sectional shape smaller than the other pin.

2. The invention as defined in claim 1 wherein said piston includes at least two lobes and wherein said device further comprises a second planar seal member slidably disposed in a second slot in said housing, said second slot being open to said chamber and diametrically opposed to said first slot, second means for slidably displacing said second seal member in said slot in synchronism with the rotation of said piston and second fluid passage means formed through said housing and open adjacent said second seal member.

3. The invention as defined in claim 1 wherein said displacing means further comprises a guide slot formed on at least one axial end of the piston and guide means secured to said seal member for engaging and cooperating with said guide slot.

4. The invention as defined in claim 1 wherein said means for displacing said valve member further includes means for sequentially moving said first valve member into sealing engagement with said piston when said second valve member is in sealing engagement with said piston and thereafter shifting said second valve member radially away from said piston.

5. The invention as defined in claim 1 wherein said piston is triangular in shape.

* * * * *

UNITED STATES PATENT AND TRADEMARK OFFICE
CERTIFICATE OF CORRECTION

PATENT NO. : 4,311,121
DATED : January 19, 1982
INVENTOR(S) : Larry L. Hartsell

It is certified that error appears in the above—identified patent and that said Letters Patent is hereby corrected as shown below:

Column 1, line 35, delete "misture", insert --mixture--.

Column 2, line 41, delete "it", insert --its--.

Column 2, line 42, delete "can", insert --cam--.

Column 2, line 46, delete "can", insert --cam--.

Column 4, line 47, after 90°, delete "C.".

Signed and Sealed this

Twentieth Day of April 1982

[SEAL]

Attest:

GERALD J. MOSSINGHOFF

Attesting Officer     Commissioner of Patents and Trademarks